United States Patent [19]

Chemarin

[11] 4,068,101

[45] Jan. 10, 1978

[54] METHOD AND APPARATUS FOR THE AUTOMATIC COMMUNICATION OF TWO TELEPHONE SUBSCRIBERS

[76] Inventor: Auguste Marie Chemarin, 10, rue de Mezieres, Paris 6eme, France

[21] Appl. No.: 674,330

[22] Filed: Apr. 7, 1976

[30] Foreign Application Priority Data

Apr. 10, 1975 France .............................. 75.11155

[51] Int. Cl.² ............................................ H04M 3/48
[52] U.S. Cl. ................................................ 179/18 BG
[58] Field of Search .................................... 179/18 BG

[56] References Cited

U.S. PATENT DOCUMENTS

| 2,534,500 | 12/1950 | Claesson et al. | 179/18 BG |
| 2,885,482 | 5/1959 | Baker | 179/18 BG |

*Primary Examiner*—William C. Cooper

[57] ABSTRACT

Automatic communication establishment between two telephone subscribers of different exchanges. The identities of the caller and the called are transferred to the called exchange in the event that the called line is busy, permitting disconnection of the two exchanges. The called's line is thereafter monitored until becoming free upon which the caller's identity is utilized by the called's exchange for calling back the caller. If the caller's line is now busy, the transfer of the called and the caller's identities take place again, this time back to the caller's exchange. The caller's line is similarly monitored until free, after which the method is repeated until communication is established.

A separate embodiment includes the step of testing whether the called party does not reply. Identities are transferred to the called's exchange for awaiting an indication that the called party has returned. The return of the called party initiates the call-back method for establishing communication.

7 Claims, 3 Drawing Figures

METHOD AND APPARATUS FOR THE AUTOMATIC COMMUNICATION OF TWO TELEPHONE SUBSCRIBERS

BACKGROUND OF THE INVENTION

1. Field of the Invention

The present invention relates to a method and apparatus for the automatic communication of two telephone subscribers, whose respective telephones are connected to different exchanges, after suitable manoeuvres for placing the two subscribers in communication have been attempted from one of their telephone equipments, these manoeuvres having failed due to the called subscriber being engaged.

2. Description of the Prior Art

The inconvenience caused by the impossibility of a calling subscriber to enter into communication with the called subscriber is known.

As far as the caller is concerned, unless he simply foregoes his call, he can expect to waste an indeterminate, but generally long time in continually repeating the calling attempt until the line is free or until he is discouraged. As far as the operation of the telephone equipment is concerned, there is an overload in the traffic due to the repeated calling attempts. In fact, to the normal efficient traffic, which is sometimes very close to saturation of the equipment, there is added the traffic of repeated manoeuvres of the consumers determined to contact the called subscriber.

To avoid the calling subscriber having to renew his calling manoeuvres until he has obtained communication with the called subscriber, it has already been proposed to effect the automatic call-back of the latter by the telephone equipment itself.

Accordingly, in the device described in U.S. Pat. No. 3,854,014, the caller's exchange comprises a store in which are stored the telephonic identities of the caller and called subscriber and, from these registered identities, it makes periodic attempts to automatic call-back of the called subscriber. Such a device, although it discharges the calling subscriber from the repeated call-back manoeuvres, brings about an overload in the telephone traffic by the periodic, thus random repeated calls which it sends from the caller's exchange to the called subscriber's exchange.

French Pat. No. 2,195,132 relates to equipment in which the calling subscriber, after having dialed the number of the called subscriber, may dial supplementary characters, characterising a desired service, for example an automatic call-back, the supplementary characters being received by a unit located in the telephone exchange of the called subscriber, then stored, and the unit automatically carries out the stored service. When the called number is engaged or the called subscriber does not reply, the caller is informed of the failure to establish communication, he dials the coded figures of the "call-back" and records a message. The line of the called subscriber is periodically watched and the recorded message transmitted thereto as soon as possible. Such a device does not therefore really place the caller and the called subscriber in direct communication, by call-back. It simply transmits to the called subscriber, as soon as possible, a message recorded by the caller. Moreover, due to its technical requirements, such a device can only be applied in private installations.

In Swiss publication "International Zurich Seminar on Integrated Systems for Speech, Video and Data Communications," 15-17 Mar. 1972, Zurich, Switzerland, a system is described in which the caller's exchange stores the identities of the caller and the called subscriber, cylically tests the called subscriber's line and, when this test discloses that the called subscriber's line has become free, automatically calls back the caller, and then the called subscriber, when the caller has replied. The drawback of such a system, according to which the exchange to which the caller is connected maintains the initiative of attempting to establish the communication, is to necessitate a permanent link (semaphore channels) between the called subscriber's exchange and the caller's exchange, the first thus being a satellite of the second. Furthermore, this system is applicable only within a local zone.

It is an object of the present invention to provide a method and apparatus for automatically calling back the caller and called subscriber, without the above-mentioned drawbacks. It avoids any random procedure of establishing the communication, eliminates any abusive traffic or any permanent link between the caller's exchange and the called subscriber's exchange and establishes the communication as soon as the called subscribers are free at the same time.

SUMMARY OF THE INVENTION

To this end, the method according to the invention for automatically placing two telephone subscribers in communication, whose respective telephones are connected to different exchanges, after suitable calling manoeuvres for communicating the two subscribers have been attempted from one of their telephone equipments these manoeuvres having failed due to the called subscriber's line being engaged is noteworthy in that, after having ascertained that the called suscriber's line is engaged, the transfer of the identities of the caller and called subscriber is effected from the caller's exchange to the called subscriber's exchange, before the two exchanges are disconnected by the caller hanging up, then the called subscriber's exchange proceeds to test the latter's line and when it is recognized to be free, the exchange of said called subscriber calls back the caller and in that, if the caller has, in turn, become engaged, the identities of the caller and called subscriber are again transferred to the caller's exchange before the two exchanges are disconnected and operations similar to the preceding ones begin again from the caller's end. In this way, the initiative of attempting communication is given alternately to that exchange to which the caller or called subscriber who was last to be engaged is connected, this initiative being taken as soon as this subscriber is free and the communication consequently being established as soon as the two subscribers are free at the same time.

If the called subscriber is engaged, the procedure is advantageously as follows:

Upon engaged signal of the called subscriber and instruction of the caller, the caller's exchange sends the called subscriber's exchange, before the link between the two exchanges is disconnected, the identities of the caller and called subscriber (or the identity of the caller if the caller's exchange is organised to have conserved the one of the called subscriber) and the called subscriber's exchange stores the identities of the caller and the called subscriber and places the latter's line under observation, whilst at the caller's exchange, the caller remains free to make or receive any call; upon identification of the return to availability of the called subscriber's line and after its momentary holding, it is then the called subscriber's exchange which, by using the caller's stored identity makes the first technical attempt, back towards the caller, the communication being established if the caller is found to be free; if the caller is found to be engaged and after communication, by the called subscriber's exchange to that of the caller, of the identities of the caller and of the called subscribed (or of the message or complementary message enabling the caller's exchange to identify the communication if it has partly or wholly stored it), the line between the two exchanges is released, the called subscriber remains free for any call and it is the caller who is placed under observation by his exchange; when the exchange ascertains that the caller's line becomes free, it is this one which makes the second technical attempt, by using the identity of the called subscriber which was stored, and so on; the initiative of attempting establishment of the communication is given alternatively to that telephone exchange to which the called or caller subscriber who was found to be engaged at the latest attempt at communication is connected, the new attempt being made by this exchange when this subscriber becomes free. The communication is consequently established as soon as caller and called subscriber are free at the same time; no circuit or channel being maintained between the two exchanges as long as the communication is not established, except for the brief duration of the technical attempts when they fail; if a subscriber is free whilst the other is not, the communication cannot be established and the free subscriber may make or receive any other call.

As has been stated hereinabove, the method according to the invention may be carried out direcly when, further to the call of the caller, the line of the called subscriber is engaged. It may also be carried out in combination with an automatic hunting procedure after it has been ascertained that the called subscriber has not replied.

In fact, after a fruitless attempt of the caller if the called subscriber does not reply (and not due to his line being engaged) and before the link line is disconnected between caller's exchange and called subscriber's exchange, the caller's exchange may send to the called subscriber's exchange, which stores them, the identities of the caller and of the called subscriber (or that of the caller if the called subscriber's exchange is organised to have conserved the identity of the called subscriber) so that the called subscriber's exchange then proceeds with the recognition of the return of the called subscriber by identification of the lifting of his receiver by observation of his line, without employing other equipment, particularly a line with the caller's exchange, whether the called subscriber be receiving or making a call or replying to a periodic call from his exchange; this recognition effected, the communication is then established by the called subscriber's exehange which calls the caller due to the fact that is has conserved his identity in a store. If the attempt at communication comes up against engagement of the caller, the procedure which has just been described is repeated.

In fact, the caller remains free to make or receive any call or may absent himself during the time that the telephone system is hunting the called subscriber.

No link or channel is established during this period between the two exchanges. Any useless traffic between exchanges may in addition be avoided by carrying out a known method of dealing with queueing calls. This method envisages the case of several calls from subscribers or call-backs from exchanges intended for the same subscriber who is engaged or who does not reply, there therefore being several communications stored and waiting to be established; the method of dealing with these queueing calls or call-backs consists in dealing with them in a successive, e/g chronological, order, the exchange of the subscriber in question making attempts in this order until a communication is effectively established, the treatment of the following, queueing calls or call-backs being effected only after this communication.

Upon failure of the first attempt (that made by the caller himself) the originating exchange preferably recognizes the location of the called subscriber according to the number or identity thereof and as a function of its knowledge of the dialling necessary to reach the caller subscriber from this location, it completes, where necessary, by the necessary supplementary figures, the number of the caller, as is usually dialled for traffic within his local zone and only then does it send to the called subscriber's exchange the message including the identities of the caller (said identity thus being completed) and of the called subscriber. This method is particularly applicable to international telephone traffic.

Independently of their transfer to the called subscriber's exchange when necessary, the identities of the caller and of the called subscriber may be stored at the caller's exchange so that an untimely renewal of the call by the caller (which is a false manoeuvre if his exchange has received the order for automatic call-back) can be immediately recognized, the actuation, by the untimely call, of the line of the members limited to a minimum and the caller possibly charged.

The orginating exchange may be provided with timing devices which limit the time of the automatic call-backs (e.g. to an hour).

It is also possible to limit the number of calling attempts, by providing for example that after for example two technical attempts following the first attempt by the caller, the call will be definitely annulled.

The instruction by the caller to his exchange to proceed with automatic call-back in the case of the called subscriber being engaged or his not replying, may be made most simply by dialling a specific number before replacing the receiver or by simply replacing the receiver after reception of the engaged tone or after the called subscriber has not replied.

Instructions not to effect the automatic call-back or to limit the duration thereof may be given by dialling specific numbers under the same conditions.

Once ordered, a call-back may be annulled by a manoeuvre by the caller which consists for example in lifting his receiver, dialling a specific number or signal, followed by the number of the called subscriber.

The telephone exchanges whose organisation, structure and diagram are such that their organs may treat the outgoing and incoming traffic according to the method of the invention, are capable amongst themselves of the mode of exploitation authorised by this method.

Conventional telephone exchanges (i.e. such as have been designed and constructed up to the present time) are also capable, amongst themselves and with the preceding ones, of carrying out of the mode of exploitation according to the method of the invention, provided that they are provided with suitable equipment for receiving and transferring messages including the identities of the caller and the called subscriber on the one hand, and on the other hand for testing the subscribers' lines to ascertain whether they are engaged or free, and finally for effecting the call-backs of subscribers as a function of these exchanges of messages and the results of these tests.

The invention will be more readily understood on reading the following description with reference to the accompanying drawings, in which:

DESCRIPTION OF THE PREFERRED EMBODIMENT

In these Figures, like elements are designated by like references.

Figure 1:
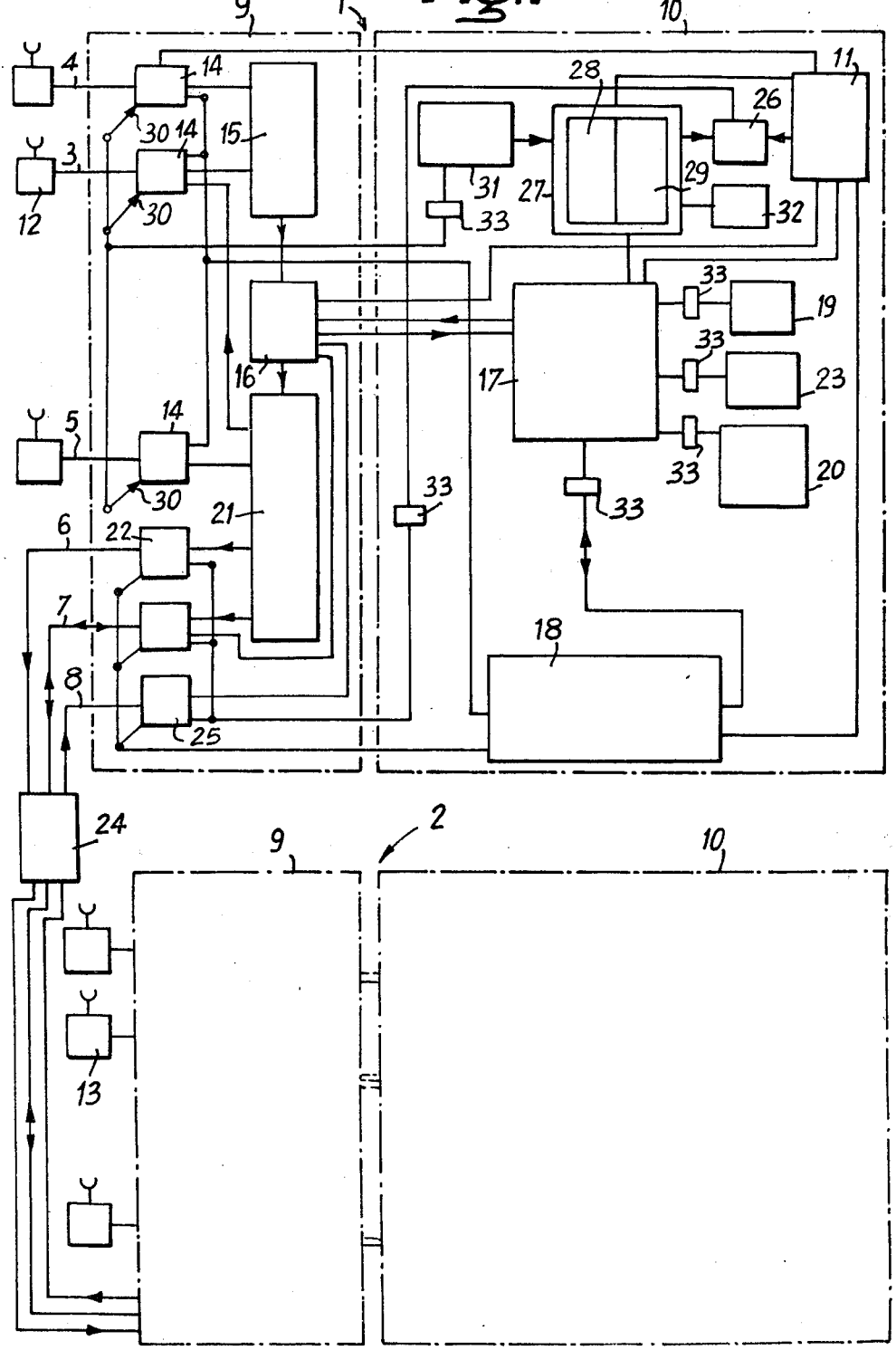
FIG. 1 schematically shows two telephone exchanges carrying out the method according to the invention; in this Figure, the structures of the two exchanges are identical and only one has been shown in detail.

Referring now to the drawings, FIG. 1 shows two similar telephone exchanges 1 and 2 (public or private) enabling the method according to the invention to be carried out and on which are attached:

a. subscribers' lines
  ordinary 3
  specialised out-going 4
  specialised in-coming 5
b. circuits or junctors (trunk circuits, local junctors . . .)
  out-going 6
  mixed 7
  in-coming 8

Each exchange 1 or 2 is represented by its two components: the conversation system 9 and the control unit 10. The conversation system 9 comprises those organs or assemblies of organs which remain connected in the course of the conversation, once a communication is established. The control unit 10 comprises those organs which are employed at the moment of establishment of the communications or which serve for auxiliary functions (charging, observation or traffic, etc.). In the control unit 10 has been shown the device 11 which enables the method of the invention to be carried out and which will be referred to as "control unit for deferred calls"; this unit 11 controls the automatic treatment of the calls which meet with engagement or no-reply of the called subscriber. The detailed organisation of the unit 11 and its links with the known part of the unit 10 is given in FIG. 2.

In order to explain FIG. 1 and subsequently to understand the specific functioning of unit 11 in connection with the conventional members of unit 10, the designation and role of the conventional members of the exchanges 1 and 2 which are assumed not to be provided with the unit 11 is firstly indicated.

It will be assumed that a subscriber 12 of exchange 1 is calling a subscriber 13 of exchange 2.

The following description is based, for clarity of the description, on a certain hypothesis of structure of exchanges, but is applicable to any type of exchange.

The looping of the subscriber's line 12 when he lifts his receiver is recognized by the corresponding subscriber's line equipment 14 which, by means of a preselection assembly 15 and a link circuit 16 routes the line onto a register 17.

The fact that the register 17 is ready to receive the dialling information which the subscriber 12 will send via the dial or keyboard of his telephone, is brought to the knowledge of 12 by a dialling tone received by the equipment 14 and whose register 17 has controlled the sending to the ringers 18. As a function of the information concerning category of telephone (keyboard or dial) which the equipment 14 has given it, the register 17 is connected to a suitable receiver 19 for receiving the dialling.

When the register 17 has received enough figures to recognize the location of the called subscriber, it may begin to transfer them in order to control the selections, after possibly being connected to a translator 20 for translating the figures into the best technically utilisable form.

Within the exchange 1, the selection will have for effect, via the same link circuit 16 and via the connecting network 21, of choosing an outgoing circuit 6 by means of the junctor 22 thereof; as a function of the signalling code used on this circuit, the register 17 is connected to a suitable sender 23 for transferring the dialling. Beyond the exchange 1, the selection provokes the necessary routing in the transit centres 24 if there are any and guides the call up to the level of an incoming junctor 25 of an incoming circuit 8 of the exchange 2 of the called subscriber 13. In this exchange 2, the taking of the incoming circuit 8 provokes, via a link circuit 16, the seizure of a register 17 which is connected, as a function of the information concerning category given by 25 to the register 17, to a receiver 19 appropriate for the signalling code used on the incoming circuit 8. The register 17 of the exchange 2 then receives the last figures of the number of subscriber 13, this enabling it, via the same link circuit 16 and via the connecting network 21, to control the selection of subscriber 13.

Upon signal "subscriber free" given by the equipment 14 of subscriber 13, the register 17 instructs the junctor 25 to call the subscriber 13 by a call signal which is sent to the equipment 14 by the ringer 18. The register 17 of the exchange 2 is then released. The junctor 25 sends, via the link line 1-2 to the orginating junctor 22 of the exchange 1, the signal "called subscriber free" and this signal causes the release of the originating register 17 of exchange 1 after control of the sending to subscriber 12 of the call-back tone coming from 18, which tone is received until the called subscriber 13 replies by lifting his receiver. At that moment, the originating junctor 22 of this exchange 1 identifies the signal "reply of called subscriber" sent by the exchange 2 and instructs the charging equipment 26 of exchange 1 to charge the communication; the latter was previously stored in the memory 27 in the form of the pair: number of the caller 28, complete number of the called subscriber 29, with all the possible complementary figures of the local number as the caller dialled them; there is therefore recording 28-29, 28 having been acquired by identification of the caller due to the testing equipment 30 and to the equipment 31 for identifying and observing the lines of subscribers at the moment when the telephone is lifted by subscriber 12, and recording 29 being made by the register 17 at the moment of reception of the dialling of the called subscriber by subscriber 12, the register 17 then completing this recording by the identity of the junctor 22 used at the originating exchange 1. At the same time as the charging, the junctor 22 may control a registration of communication in the traffic observation equipment 32.

In FIG. 1 (and similarly in FIG. 2), the equipment designated by reference 33 is composed of intermediate members for testing, selection and connection.

According to the automatic telephone method used almost everywhere up to the present day, the case of an engaged subscriber is dealt with as follows; if subscriber 13 of exchange 2 is engaged, the corresponding equipment 14 is formed of this, informs the junctor 25 via the conversation system 14-21-25 and the junctor 25 of the exchange 2 sends the junctor 22 of exchange 1 the "subscriber engaged" signal. This manoeuvre having been effected, everything at the exchange 2 is released and the line 1-2 is broken. The signal "subscriber engaged" received by the junctor 22 of exchange 1 causes the engaged tone coming from 18 to be sent to subscriber 12 and the register 17 of exchange 1 to be released: subscriber 12 now has the choice between calling again or giving up.

The method forming the subject matter of the present invention will now be described and to this end, reference will be made to FIGS. 1 and 2.

Figure 2:
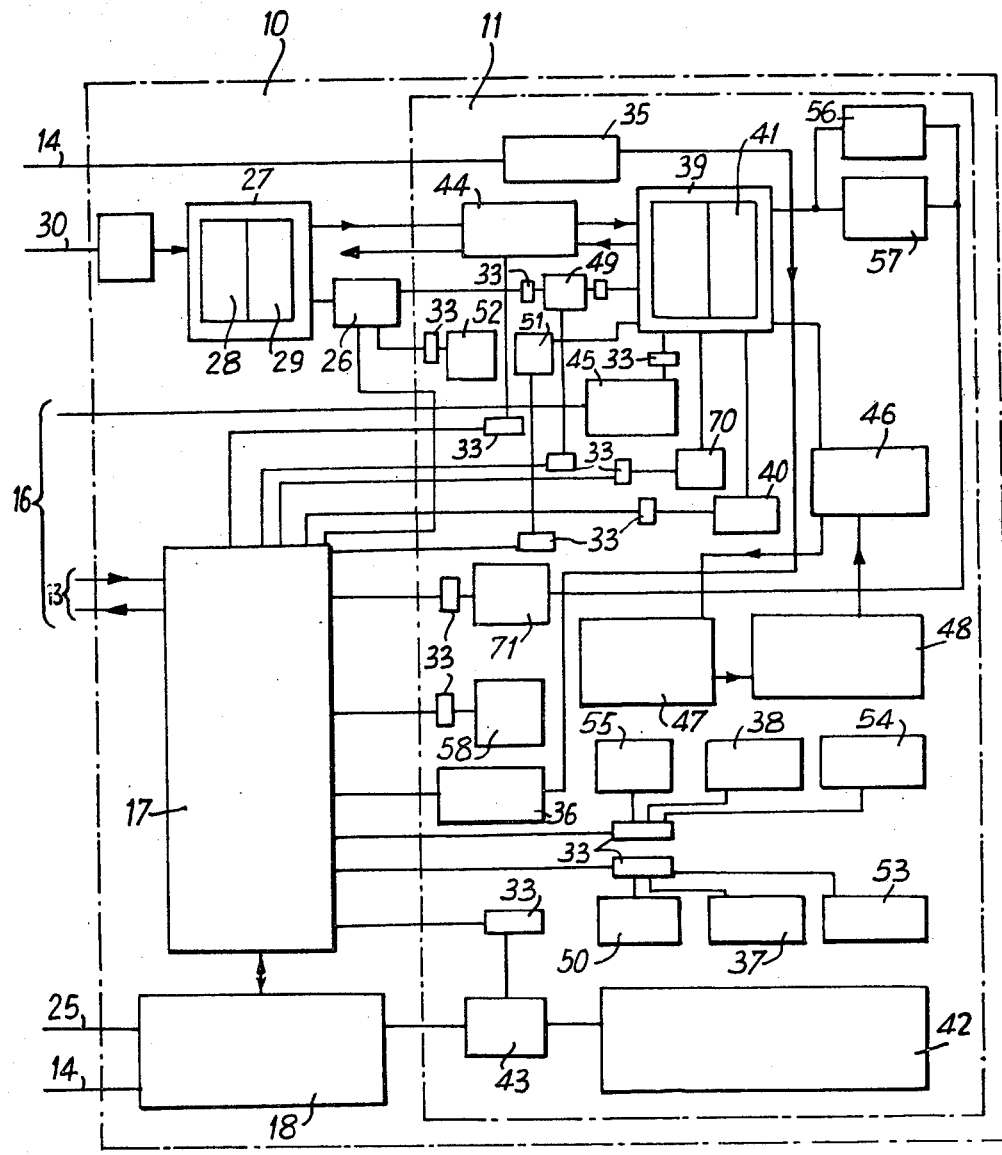
FIG. 2 schematically illustrates in greater detail the constitution of the control unit for deferred calls from the exchanges of FIG. 1.

FIG. 2 shows only the members of FIG. 1 in liaison with unit 11.

A first feature of the method consists in identifying the lines which benefit therefrom by a complementary device 35 (e.g. supplementary relay contact) of the subscriber line equipment 14 (cf. FIG. 2).

A variant arrangement which forms part of the invention, consists in that the lines which do not benefit from the method, form the object of a complementary device. The lines, in a greater number, benefitting from the method, would then be recognized as such by the register 17 in the absence of the information supplied by the complementary device; it would therefore be the equipment of these lines benefitting from the method which would then not have any complement.

The information relative to the fact that a subscriber's line benefits from the method of the invention will be exchanged between the registers 17 of the exchangers carrying out this method, by signals designated hereinafter as "signals P" specific of the signalling code. These are signals added to the list of the register signals.

The case will now be described where, for communications where one of the subscribers is engaged, use is made of two signals P, viz. "forward" $PV_1$ and $PV_2$ (caller's exchange towards called subscriber's exchange) and "backward" PR in the other direction.

The case selected is that where the instruction for automatic callback by the caller 12 is given simply by his replacing his receiver.

The following differences are noted from the conventional method described hereinabove. When subscriber 12 lifts his receiver, the device 35 sends signal P to register 17. The register 17 receives it in its signal receiver 36 of subscribers' lines. In view of this information of the receiver 36 and as soon as the register 17 recognizes by the dialling sent by 12 that the communication is intended for a subscriber 13 at another exchange 2, the register 17 is connected to a signal $PV_1$ emitter and it sends this signal $PV_1$ to the register 17 of exchange 2, upon dialling transmission manoeuvres. At exchange 2, the register 17 receives this signal in a $PV_1$ signal receiver 38 associated with a suitable receiver 19, then it selects the subscriber 13.

If subscriber 13 does not benefit from the method of the invention and is engaged, the exchange 2 sends the signal "subscriber engaged" to exchange 1 and everything occurs as for a conventional communication.

If subscriber 13 benefits from the method according to the invention, the register 17 of the exchange 2 is informed of this by the device 35 of the subscriber 13. It positions itself accordingly. In particular, this positioning may be characterised by the fact that the registers remain connected whilst in similar situations in conventional exchanges, they would be released, or by the fact that they function cyclically in order to receive several numbers successively.

At the moment when subscriber 13's line proves to be engaged, the following operations, concerning the phase which will be referred to as phase 1, are carried out:

OPERATION 1 (Phase 1)

At exchange 2 a. sending a signal PR and of "subscriber engaged" signal towards exchange 1;

b. maintenance of the members in connection in the unit 10 of the exchange, c. the register 17 of the exchange 2 which is held transfers into a store 39 for deferred calls by a recording device 40, the identity of the called subscriber which it has kept on being informed that 13 was engaged. This transfer is made in column 41 of the numbers requested by the double effect, on the one hand, and having received the signal $PV_1$ and on the other hand, of the fact that the called subscriber is engaged. The recording is accompanied by a conventional sign which will be designated hereinafter by Z (engaged). The recording will therefore be 29 - Z (29 being the designation of the called number).

Operation 2 (phase 1)

At exchange 1 a. the reception in the exchange 1 of signal PR by the register 17 informs it that it is a communication benefitting from the method according to the invention between two subscribers 12 and 13 (for 12 due to the earlier information). The reception of the signal "called subscriber engaged" is effected by the register 17 remaining in connection, which causes an engaged tone to be sent to the caller 12 which is not the conventional tone but a specific one (or a recorded announcement) indicating that an automatic call-back will take place shortly. This tone is sent by a supplementary ringer 42 upon instruction of the register 17 which instructs a tone-routing equipment 43 to operate.

b. the subscriber 12 replaces his receiver and awaits the automatic call-back.

c. after this manoeuvre (b), the register 17 controls, by a forward-backward transfer equipment 44, the transfer of the information relative to the communication 28-29 from store 27 to store 39.

This transfer having been effected, the store 27 does not keep any copy.

d. the store 39 then transmits by means of an automotic dialling reader-emitter 45, the number caller 28 to the register 17 via a link circuit 16.

The store 39, as a function of the geographical position of the called subscriber, characterised by its number 29 and if need be by interrogating by an interrogation and response device 46 a fixed store of correspondence 47, has previously completed, from all necessary figures and signs (prefixes, codes, intermediate tones etc). The local number of the caller in order that, if the communication is effected out of the local zone, the next attempt from the exchange to which the number 28 will be transferred may be made. To this end, the store 47 controls the transfer of the desired information in the form of a recording taken from a register of complementary figures and tones 48.

The register therefore contains only a very limited number of recordings relative to the geographical situation of the exchange 1 and which concern:
  the national codes if the national dialing is open (N)
  the international prefix and code (I)
  (prefixes and) codes of local lines (V)

It should be noted that the complements will generally be acquired by simple consideration of "symmetry" between 28 and 29.

The register 17, being connected to a sender 23 appropriate for the signalling code used by the circuit 6 then sends to the exchange 2 the number of the caller completed in this way.

e. the store 39 of the exchange 1 conserves the recording of 28-29. There are two reasons for this:

In the case of the subscriber 12 (No. 28), by impatience or forgetfulness calling subscriber 13 back himself, whilst the call is already registered and being dealt with or awaiting treatment by the machines, the register 17 recognizes this by a recognition test equipment 49 in liaison with the store 39; instead of carrying out the dialling instructions received from 12 and unnecessarily holding the whole of the line of organs, the register 17 sends the engaged tone with automatic call-back directly to subscriber 12 and, if the regulations are such, the charging upon instructions given to 26 by 49 in liaison with store 39.

It may be noted that, in order to avoid the register 17 systematically calling the equipment 49 for all the calls, it may be useful if the callers have communications on hand be placed under observation in the sense: non-engagement to engagement, the change being brought to the knowledge of the register 17 (this not being shown in FIG. 2) which would call 49 only in this case.

In the case of subscriber 12 (No. 28) lifting his receiver, whilst a call from him as caller is being delt with, the equipment 49 already comes into action, after simple identification of 28 in the corresponding column of the store 39 or, as has just been stated, because his line was being tested to make register 17 control the sending to 12, by intervention of 43, not of the dialling tone but of a special tone furnished by 42.

This special tone may for example be the dialling tone modulated in a characteristic fashion.

The aim of this special tone is two-fold: to warn the caller that a previous call from him is still being dealt with and also to dissuade him from repeating a call which is being dealt with.

Operation 3 (phase 1)

At exchange 2 a. the number of the caller sent by exchange 2 (operation 2 phase 1), paragraph (d) is received by the register 17 and by the recording device 40 is recorded in the store 39 in association with 29 which is already there (operation 1 - phase 1, pragraph (c).

b. as a function of the characteristics of 28 read by the memory 39 assisted if necesary by 47, the register of the complementary figures and tones 48 completes the number 29 of the complements which may be necesary for the subsequent retransmission of 29 to exchange 1, according to the same procedure as before for 28 in exchange 1.

Operation 4 (phase 1)

Once effected, the exchanges of information which assure the exchanges 1 and 2 that all the preceding operations have been carried out, the whole line within said exchanges and between themselves is released. The only remaining traces of the call are:
  at the exchange 1, the recording of the communication 28-29 in the store 39 of the unit 11 at exchange 2;
  at exchange 2, the same recording accompanied by the mention Z opposite 29 in the memory 39 of unit 11 in association with 30 observing the equipment 14 of the engaged called subscriber 13.

Other variant operations may also be considered which also form part of the invention and lead to the same end; in operation 1 (phase 1), paragraph (b), the transfer into the store 39 of 29 need not be effected and for example number 29 could be transmitted further to 28 during operation 2 (phase 1) paragraph d, after the registers would be placed in position for cyclic functioning. The drawback of this is the increase in the time taken to transmit the message.

Phase 2: subscriber 13 becomes free.

Operation 1 (phase 2)

a. at exchange 2: the testing equipment 30 recognizes the opening of the loop of subscriber 13's line, informs the equipment 31 which communicates the information to memory 39. Said latter seizes the reader-emitter 45 which, via a link circuit 16, communicates to the register 17 on the one hand the information Z (engaged) associated with 29 (29-Z) and on the other hand the number 28 of the caller.

Upon information Z, the register 17 is connected to an emitter 50 of "backward" signal PR associated with a suiable sender 23 and transmits to the exchange 1 the number 28, as well as signal PR.

b. By using the number 29 which, however, is left in the store 39 and which is transmitted thereto by the reader 45 under the same conditions as 28 before, the register 17 then controls the selection of the called subscriber 13. In this way, by the link circuit 16 (taken by the reader 45) and by the connecting circiut 21, the line of the subscriber 13 is inserted in the future conversation line. In view of the presence of the testing equipment 30 which has not yet been released on the line of subscriber 13, the latter's telephone is not rung and once the subscriber's line is inserted in the future conversation line and marked "engaged," the equipment 30 is then released.

c. The register 17 then re-uses the number 29 and in turn sends it towards exchange 1.

d. Once the assurance is acquired that the exchange 1 has received all these messages, the recording (28-29) is effaced from store 39 upon control of an effacing device 51 acting on instructions from register. The register and all the members of the control unit 10 of the exchange 2 which had been used for establishing this communication are released.

Operation 2 (phase 2)

At exchange 1 a. a register 17, in possession of the local part of the number 28 controls the selection via a link circuit 16 and via the connecting network 21 of the caller and transfers the number 28 into the store 39 by means of a device 40 in the column of the callers, taking into account the information "backward" signal PR received by the receiver 55.

Still upon same information, the register 17 puts itself in cyclic positon and then receives the complete number 29 of the called subscriber which it also transfers into store 39 by the recording device 40.

b. In possession of the pair (28-29) and by the effect of the signal PR which has been transmitted thereto, the store 39 makes a comparison with the same recording made thereon earlier and it is in position awaiting instructions.

Two cases then arise: either subscriber 12 of exchange 1 is free or he is engaged.

If subscriber 12 is free:

c 1. Upon internal signal at exchange 1 "subscriber 12 free", this subscriber's telephone is called; it is desirable (although not compulsory) if subscriber 12 is "called back" by a specific ringing without this requiring a modification to the subscriber's telephone; this may for example be by a ringing which is twice as quick as calls for called subscribers; the special "call-back" call is provoked upon instruction of the register 17 by the tone routing equipment 43 which gives the order to the special ringer 42, which sends a special ringing current to the line of subscriber 12.

d 1. Upon the same internal signal at exchange 1: "subscriber free" and upon control of the transfer given by register 17 to the equipment 44, the store 39 transfers to store 27 the pair 28-29 which is effaced from store 39.

e 1. After time T1 (e.g. 6 seconds) determined by a timing device 52 to which it is connected upon instruction of register 17 before the latter is released, the charging device 26 may begin charging if the regulations have provided for this arrangement.

f 11. After time T2 (e.g. 20 seconds), characterised by a timing incorporated for example in the complementary equipment 35, if the subscriber 12 has not replied, everything is released and effaced from exchange 1 and exchange 2; the line between the exchanges 1 and 2 is released and the charge on the connection 1-2 stopped at 20 seconds.

f 12. if subscriber 12 lifts his receiver; a signal "reply of subscriber" is sent via a junctor 25 of exchange 1 to a junctor 22 of exchange 2 and the subscriber 12 connected to exchange 2 is rung.

When subscriber 13 lifts his receiver, a signal is retransmitted towards exchange 1 and provokes, via junctor 25 of exchange 1, the beginning of charging by device 26 (unless it has already begun if the subscribed 12 has lifted his receiver after call time T1).

All the other members of the control unit 10 of exchange 1 are released and communication is established.

If the subscriber 13 does not reply and if subscriber 12 replaces his receiver, all the members of exchanges 1 and 2 return to rest, everything is effaced and the lines released.

If subscriber 12 is engaged:

C 2. a signal "subscriber engaged" in this phase provokes the complete release of the line between exchanges 1 and 2 and of all the members at exchange 1.

The only remaining traces of the call are in exchange 1, as follows; the line of subscriber 12 is placed under observation in liaison with the recording 28-29 which is maintained in the memory 39.

Operation 1 (phase 3)

a. The equipment 30 for testing equipment 14 of exchange 1 recognizes that the subscriber 12 becomes free after he has replaced the receiver. It informs equipment 31 which informs store 39. The latter seizes a reader 45 which, via a link circuit 16, transmits to register 17 the number 29 further to the absence of signal z.

For the same reason (absence of signal Z) which would otherwise control the choice PR) and since the signal P receiver brought into action by the calls coming from the subscribers themselves is not taken, the register 17 is connected to a signal PV 2 emitter 53 and sends this signal (and not PV 1) to exchange 2 with the number 29 of the called subscriber which remains recorded in the store 39 of exchange 1.

b. Furthermore, by using the number 28 which is, however, left in store 39, the register 17 then controls the selection of the subscriber 12 by receiving, via the same link circuit by reader 45, the number of subscriber 12. Thus, by a link circuit 16 and the connecting network 21, the line of the caller subscriber 12 is inserted in the future conversation line. In view of the presence of the test equipment 30, which is not yet released on the line, the subscriber 12 is not rung and once his line is inserted in the future line and marked "engaged," the equipment 30 is then released.

Operation 2 (phase 3)

At exchange 2: a. a register 17 receives the signal PV2 in a receiver 54 and in possession of the local part of the number 29 controls the selection, via a link circuit 16 and the connecting network 21, of the called subscriber 13.

Two cases arise: either subscriber 13 of exchange 2 is free or he is engaged. If subscriber 13 is free:

b 1. Upon internal signal at exchange 2 "subscriber free," the line of subscriber 13 is seized and held, but the registration, because of information PV 2, does not given the instruction to ring subscriber 13. The signal "subscriber free" is returned to exchange 1. At exchange 1, this signal provokes the following operations:
  transfer of recording 28-29 from store 39 to store 27.
  special call of subscriber 12 by rapid ringing provoked by control, upon instruction of register 17, by an equipment 43 to ringer 42.

The operations described previously under (e 1), (F 11), (f 12) of operation 2 (phase 2) take place.

If now subscrier 13 is engaged:

b 2. upon internal signal at exchange 2 "subscriber engaged," line 13 is maintained under observation by the testing equipment 30.

c 2. The register of exchange 2, which is held, transfers number 29 which it has conserved according to the information that 13 is engaged by equipment.

This transfer is made in the column of the numbers called by the fact that the identification of the called subscriber was made after reception of a forward signal P. The recording is accompanied by the conventional signal Z 'engaged').

d 2. At exchange 1: the reception of signal "called subscriber engaged" provokes the sending to exchange 2 of the number of the caller, the recording 28-29 being, however, maintained in the store 39, as has been seen under (d) and (e). operation 2 (phase 1).

e 2. at exchange 2, the number 28 is received as in operation 3 (phase 1).

f 2. Once the exchanges of information which assure that both at exchange 1 and at exchange 2 all these operations have been carried out are effected, the whole line within exchanges 1 and 2 and between them is released. The only remaining traces of the call are:

at exchange 1, the recording of the communication (28-29) in store 39;

at exchange 2, the same recording accompanied by mention Z (engaged) opposite 29, in association with the maintenance under observation by the testing equipment on the equipment 14 of the called subscriber 13.

If subscriber 12 is free:

Phase 4: subscriber 13 becomes free. This case is the repetition of phase 2.

Phase 5: the subscriber 12 has been found to be engaged during the attempt of phase 4 and he then becomes free. This case is the repetition of phase 3, etc.

In the different phases of execution of the call-back method in the case of engagement, it has just been indicated that, upon each technical attempt, the selection of the line of the subscriber who is no longer engaged, is systematically effected, for its connection with the future conversation line. As a variant, this selection may be effected only after reception of the information that the line of the other subscriber is not engaged. End of operations:

The indication that the next attempt will be the last is given to the store 39 with (28-29) either by a clock 56 after a determined period of time counting from the initial recording, or by an attempt counter 57. This latter may consist in a place for recording in the store 39 reserved near that which is intended for the pairs of numbers. This end signal recording will be designated hereinafter by F.

It is assumed that the last attempt will be made from exchange 1.

The functioning is as follows by comparison with the case indicated previously in phase 3, to which case reference will be made (operation 1).

a. In addition to the functioning indicated, the reader 45 of exchange 1 communicates to register 17 with (29) the information F. On this information, the register is connected to a last attempt equipment 58 which transfers information F to exchange 2.

This provokes the following:

b1. case of the subscriber 13 being free: functioning identical to that of phase 3 (operation 1) hereinabove.

b2. case of subscriber being engaged: The presence of F annulus signal P and everything occurs as for a call coming from a caller who does not have the method according to this invention.

As from now, the register 17 is released in the exchange 2 after having caused the signal "called subscriber engaged" to be sent to exchange 1 where, on positioning of the equipment 58 on the register 17, everything is released and effaced in the link 1-2, and between the exchanges 1 and 2, the last operation being the sending of a ringing "click" to the line of subscriber 12, i.e. for example the ringing signal for one second upon instruction of the register 17 by the equipment 58 given via the equipment 43 to the special ringer 42 which sends the ringing click current, said current being transmitted via the register just before its release.

As indicated hereinabove, the calls may be dealt with in a queue. The treatment of the queueing calls has for its object to avoid useless technical attempts at calling, by proceeding with one attempt at a time when the same subscriber is the object of several calls. A simple rule is for example to deal with these calls in the order in which they are recorded in the store 39 of the exchange. The following table shows a fragment of memory 39 of exchange 1.

| Row | Caller | Called subscriber | Index |
|-----|--------|-------------------|-------|
| 1 | 54-745242 | 78-713000 | F |
| 6 | 24-982233 | 54-745242 | Z |
| 7 | 745242 | 429976 | |

In the store 39, three recordings are, inter alia, imbricated. These recordings concern the subscriber 12 of exchange 1 whose number in the local zone is 74 5242. Two of these recordings are for long-distance communications, for which the figures 54 have completed the local number of subscriber 12; for one, 12 is the caller for the other, the subscriber called. The third communication is local. It is assumed that line 74 5242 of exchange 1 becomes free. It is the communication with 78 71 300 which is firstly attempted. If the latter subscriber is free, the communication between him and 12 is established and no other attempt is made immediately. The other recordings remain in store 39. If said latter subscriber is engaged, the recording of the communication is effaced since it was the last attempt (sign F). The store then attempts row 6 (with 24-982233 as long-distance caller subscriber). If subscriber 24-982233 is free, the communication is established and no other attempt is made immediately and the recording of row 7 for 74 5242 remains in store 39. If this subscriber is engaged, the recording of row 6 is transferred to his exchange and the recording is effaced from the store 39 of exchange 1, since subscriber 74 5242 was not the caller. The store 39 then deals with the last communication.

Figure 3:
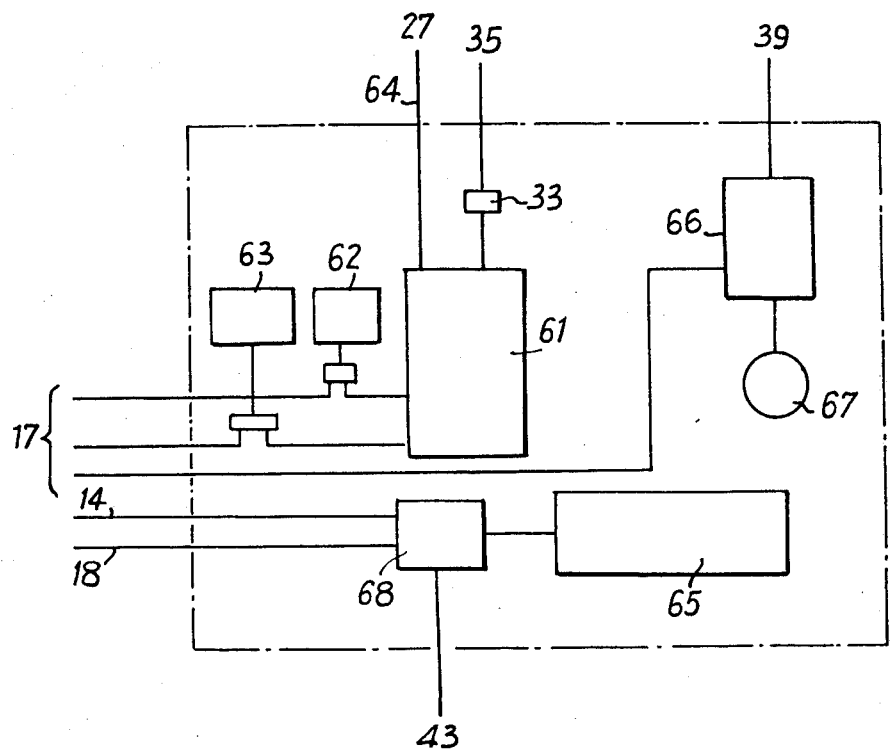
FIG. 3 schematically shows the constitution of the control unit for dealing with no-reply.

FIG. 3 illustrates the treatment of the cases of subscriber 13 not replying. It is assumed that the called subscriber 13 does not reply. If caller 12 does not persist in his effort to telephone, he replaces his receiver and everything is annulled, as in the case of conventional exchanges.

The caller subscriber 12 of exchange 1 may also wish the telephone equipment to attempt to establish the communication itself, later.

In this case, he dials a figure, for example 4, before hanging up.

Numerous arrangements may exist for the operations which follow one another for the telephone equipment. The present invention applies to those which carry out, at one moment or another, the procedure of transferring the information characterising the communication to the exchange of the subscriber who does not reply and the alternative transfer procedure already described when, the called subscriber having replied, the obstacle arises on the subscribers' being engaged.

One of these arrangements is described by way of non-limiting example. In this example, the caller 12 will be able to dial the figure giving instructions (4) only after a determined period of time which will be indicated by a special signal.

FIG. 3 shows a device 60, associated with the unit 11 and which, according to this example, deals with the no-replies.

In the two exchanges 1 and 2, lines 12 and 13 (12 on call-back tone and 13 on ringing current) are connected, at the level 14-35 after a determined period of time T3 (for example T 3 equal to 60 seconds), to an operational no-reply equipment 61.

In exchange 2, the equipment 61 is connected to a signal PV3 emitter whilst in exchange 1, the equipment 61 is connected to a signal PV3 receiver 63. The exchange of signal PV 3 is effected between the two exchanges 2 and 1, with the safety means appropriate to the synchronisation of the timings.

The reception of signal PV3 in exchange 1 triggers off the three operations of the equipment 61, namely:
control of the holding of the recording in store 27 by a recording holding line 64 and, if the regulations are such, in order of charging;
temporary opening of the conversation line, this bringing about on the one hand the release at exchange 2, then of the circuit between the exchanges 1 and 2 and in exchange 1 between 22 and 14, on the other hand seizure of a register 17 via a link circuit 16 as for a new communication.

This register 17 receives by equipment 61 signal information received in a signal receiver 36 and it positions itself accordingly for a particular dialling reception.

In particular by the equipment 43 which routes on the ringer 65 for no-replies, the caller 12 receives a special call-back tone instead of a dialling tone, for example, a tone which is twice as rapid as the normal call-back tone.

For the caller 12, the special call-back tone means that the automatic call-back service in the case of no reply exists in the relation between exchanges 1 and 2.

If the subscriber 12 remains off the hook without doing anything, beyond the normal time, the register 17 is released and he receives the usual engaged tone on normal timing of the register 17.

On the contrary, subscriber 12 may give the order for hunging, by dialling a suitable specific number, e.g., 4, for a normal hunting R$n$ or 6 for a hunting of limited duration R$l$.

The register 17 receives this figure and, in combination with the link 64 gives the equipment 44 the order for transfer of the identities 28, 29 from store 27 to store 39, the recording in the latter being effected, according to the case, in the form of normal or limited hunting. At the same time, if the regulations require it, the register 17 instructs the device 26 to charge the connection 28-29.

The recording R$n$ or R$l$ associated with 28-29 is effected by a recording and association device 66 which associates the recording with a periodic call clock 67. After a first period of time (e.g. 10 minutes), the clock 67 controls the triggering of the first technical attempt by transfer of 28-29 from the store 39 to register 17 by a reader 45 (via a link circuit 16). However, the copy (28-29) is conserved in store 39. Upon reading of the recording "R$n$" or "R$l$," the register 17 controls the selection of the subscriber 12 without his being rung and if 12 is free, it holds his line and is connected to an emitter 62 for sending the identities 28, 29 and the signal PV3 to exchange 2. In said latter, by effect of the information 29, the subscriber 13 is selected and all the information is transferred to store 39 by the register of exchange 2 with recording A (in-coming). This recording is associated by 66 with a clock 67. If the subscriber 12 had not been free, his line would have been tested and the attempt from exchange 1 would then have been triggered off by the state of availability of subscriber 12.

Once the recording is made in store 39 of the exchange 2, the registers 17 of exchanges 1 and 2 are released, after the register of exchange 1 has, by way of preparation, by an equipment 43 and a tone change equipment on junctor 68, effected the possible future connection of the junctor 22 on the special ringing current of ringer 42 instead of the call ringing of the machine 18. The same occurs after the register of the exchange 2 has effected by a similar manoeuvre the possible future connection of the junctor 25 on 65.

In exchange 2, if subscriber 13 is free and lifts his receiver, he receives via machine 65 a recorded announcement of a deferred communication further to his absence. After a certain time T4 (6 seconds, for example), the exchange 2 then returns to the exchange 1 the signal "reply requested." This provokes the call-back of subscriber 12 with the special ringing current.

The sequence of operations indicated previously in operation 2 (phase 2) in (e 1) (f 11) is effected, if the subscriber 12 does not reply. Subscriber 13 is then informed by another recorded announcement during a period of time T4 (6 seconds, for example) before complete release at exchange 2, at exchange 1 and between the exchanges 1 and 2 and after the subscriber 12 has been charged. If subscriber 12 replies, communication is established. If the subscriber 13 is free and does not reply, the timing acts after 60 seconds and completely releases the line. All the remains at the exchange 1 is information 28-29 R$n$ and R$l$ and at exchange 2, 28-29 R$n$ (or R$l$) - A (A = incoming, waiting). The two clocks 67 of the exchanges 1 and 2 are also synchronised, clock 67 of exchange 1 having an excess safety margin. (e.g. 1 minute).

At exchange 2 and according to indication R$n$ or R$l$, the clock 67 will effect $n$ or $m$ attempts ($m < n$). These attempts, due to mention A of the recording will be purely local at periodic intervals (of 10 minutes for example). Either the call-back of the subscriber has been identified by the test (call of 13 or by 13), in return for which he is called at the end of engagement, or he has replied to a call provoked by the clock 67 of exchange 2; the connecting manoeuvres are effected upon control of this exchange due to the number 28 which makes it possible to establish the call-back line to subscriber 12. In the case of subscriber 12 being engaged, subscriber 13 is informed by a recorded announcement and the procedure becomes that of connecting upon engagement.

Once the number $m$ or $n$ is reached, and if subscriber 13 has not replied, everything is automatically effaced in exchanges 1 and 2 and the subscriber receives the "ringing click" provoked by the clock 67 of exchange 1 in liaison with the register 17 after the store 39, by 45, has given the instruction of selection of subscriber 12. One or other of the instructions given by 12 (hanging up upon engagement or specific number for attempts upon no-rely) may be annulled later if necessary by a call comprising a specific signal followed by the number of the called subscriber. The register 17 receives the information in an annulation receiver 70 (FIG. 2) which annuls the recording of the store 39 of exchange 1. The subsequent operations possibly originating from exchange 2 for this communication are annuled by identification at exchange 1 of the absence of recording and the manoeuvers of general effacement are effected.

Being question of the deferred establishment of the communications upon engagement, the subscriber 12 may annul it or reduce the duration thereof by a specific number, at the moment of the call when he receives a tone indicating that there will be an automatic call-back shortly. This manoeuvre is placed at the moment described in (b) in operation 2 (phase 1). In (c) operation 2 (phase 1) the register takes the consequences and provokes the execution of the orders of the subscriber either by annulling everything or by suitably positioning 56 or 57.

Similarly, the subscriber 12 may later reduce the duration of hunting upon engagement by a specific number, followed by the number of the called subscriber. The register 17 receives this information on a receiver 71 for reducing the duration of establishment upon engagement and consequently gives its orders to 56 or 57.

In the case of internal communications at the same exchange, the functioning is identical to what has just been described, whether it be question of engagement or no-reply with the simplification that everything occurs on the same memory 39 and there are no junctors of intermediate circuits in the dialogues between members. The procedure of testing the line of the subscriber who has just been found to be engaged, remains.

Certain of the assemblies indicated to explain the invention may obviously be grouped. This applies for example to stores 27 and 39.

What I claim is:

1. A method for the automatic communication of two telephone subscribers whose respective telephones are connected to different exchanges, wherein a caller subscriber calls a called subscriber, including the steps of: first testing whether the called is engaged; transferring the identities of the caller and the called from the caller's exchange to the called's exchange responsive to said first testing indicating the called is engaged, said transferring permiting the disconnection of the two exchanges; second testing by the called's exchange for indicating line freedom of the called's line; calling back the caller by the called's exchange responsive to said second testing indicating that the called's line is free; and repeating said first testing step responsive to the step of calling back the caller by the called's exchange, said repeating occurring with the "called" changing status to that of the "caller," and the "caller" changing status to that of the "called."

2. A method according to claim 1 and further including the additional steps of: third testing whether the called replies;
transferring the identities of the caller and the called from the caller's exchange responsive to said third testing indicating the called does not reply, said transferring permitting the disconnection of the two exchanges;
fourth testing by the called exchange for the return of the called by monitoring the called's line, responsive to said third testing; and
initiating said second testing step responsive to said fourth testing indicating return of the called.

3. A method according to claim 1 and further including the step of: queueing of the identities of the caller and the called according to the order of transfer to a subscriber; and wherein said step of calling back the caller calls back according to said order.

4. A method according to claim 1 and further including:
storing said identities of the caller and the called at the caller's exchange;
recognizing said caller's utimely calling back the called; and
stopping the effects of said untimely calling responsive to said step of recognizing.

5. A method according to claim 1 and further including: timing of a predetermined time period; and annulling said identities and said step of second testing responsive to the timing completion of said time period.

6. A method according to claim 1 and further including: counting of said first testing occurring from original caller's exchange; and annulling said identities and said step of transferring responsive to the counting of a predetermined number of counts.

7. Apparatus for the automatic communication of two telephone subscribers whose respective telephones are connected to different exchanges, wherein a caller subscriber calls a called subscriber, including the steps of:
first means for testing whether the called is engaged;
means for transferring the identities of the caller and the called from the caller's exchange to the called's exchange responsive to said first means indicating the called is engaged, permitting the disconnection of the two exchanges;
second means for testing by the called's exchange for line freedom of the called's line;
means for calling back the caller by the called's exchange responsive to said second testing means indicating that the called's line is free; and
means for initiating said first means responsive to said calling back means wherein said "called" subscriber changes status to that of the "caller" and said "caller" changes status to the "called."

* * * * *